United States Patent [19]  [11] 4,009,378
Sakamoto  [45] Feb. 22, 1977

[54] IGNITION TIMING CONTROL SYSTEM FOR AN INTERNAL COMBUSTION ENGINE
[75] Inventor: Shinichi Sakamoto, Hitachi, Japan
[73] Assignee: Hitachi, Ltd., Japan
[22] Filed: Dec. 6, 1974
[21] Appl. No.: 530,280
[30] Foreign Application Priority Data
  Dec. 7, 1973  Japan .............. 48-136046
[52] U.S. Cl. .................. 235/152; 235/150.21
[51] Int. Cl.² ........................... G06F 1/02
[58] Field of Search ........ 235/152, 150.21, 151.11
[56] References Cited
  UNITED STATES PATENTS
3,555,253  1/1971  Seki ................ 235/151.11
3,564,222  2/1971  DiPaola ............... 235/152
3,846,625  11/1974  Sasayama ............. 235/152

Primary Examiner—David H. Malzahn
Attorney, Agent, or Firm—Craig & Antonelli

[57] ABSTRACT

Engine revolutions are divided into plurality of ranges and it is assumed that engine revolutions are proportional to the angle of lead of the ignition time in each range. Upon receipt of a signal representing engine revolutions, a range to which the signal belongs is determined and the data including a proportional coefficient of that range is read out of an address of a memory corresponding to the range, thus determining an angle of lead according to the data.

8 Claims, 4 Drawing Figures

IGNITION TIMING CONTROL SYSTEM FOR AN INTERNAL COMBUSTION ENGINE

The present invention relates to a phase control apparatus, or more in particular to a phase control apparatus capable of changing a phase condition for each of a plurality of frequency bands in the case where frequencies involved vary over a wide range.

The present invention can be suitably applied to the ignition time control apparatus for the automobile.

In the conventional phase control apparatus, the phase angle is changed in proportion to frequencies, or in other words, the proportional coefficient between frequencies and phase angles is constant. Demand is high, however, for a comparatively low-cost phase control apparatus which is capable of changing the phase angle faithfully in accordance with the frequencies varying over a wide range.

In the ignition time control apparatus for the automobile, for example, an optimum ignition time point undergoes intricate changes in accordance with the frequencies, that is, engine speed. The phase value, that is, angle of load for ignition must be changed in a non-linear way with the frequency. This accurate ignition time control is required for many reasons including reduction in the amount of obnoxious components in the automobile exhaust gas.

Accordingly, it is an object of the present invention to provide a phase ccontrol apparatus which is capable of determining with high accuracy an optimum phase amount undergoing non-linear variations with frequencies.

Another object of the invention is to provide a phase control apparatus suitable for ignition time control of the automobile.

Still another object of the invention is to provide a comparatively low-cost phase control apparatus capable of controlling intricate variations in phase.

According to one aspect of the invention, input signal frequencies varying over a wide range are divided into a plurality of bands, in each of which there is a linear relation between frequency and phase according to a proportional coefficient (hereinafter referred to as the "phase modulation coefficient").

Two types of input signals including the first input signal and the second input signal with different duty cycles are received in accordance with the frequencies. The first input signal is used for determining a frequency band and the phase modulation coefficient of that frequency band. According to this phase modulation coefficient, a phase amount is determined. In determining a frequency band and phase amount, an up-down counter is used. First, within the range of the first input signal, pulses of predetermined frequencies are counted up so that a frequency band is determined on the basis of the resulting counts. Next, pulses of frequencies related to a phase modulation coefficient of that frequency band are counted down thereby to determine a phase amount.

According to another aspect of the invention, there is provided a phase control apparatus comprising: a memory for storing information $X$ on frequency bands, information $YU$ on the first modulation coefficient, information $Yn$ on the second modulation coefficient and the value $Z$ of the final counts; an oscillator for producing pulses of a predetermined frequency; a first counter whereby the first modulation coefficient information $YU$ is read out of the memory and set under the first state $\alpha\pi$ of an input signal with frequencies varying over a wide range and the second modulation coefficient information $Yn$ is set under the second state $(1 - \alpha)\pi$ of the input signal, the first counter producing one pulse for each count taken of the output pulses produced from the oscillator; a second counter for counting up the output signal from the first counter under the first state of the input signal and for counting down the output signal from the first counter under the second state of the input signal; read means for shifting the read address of the memory in accordance with the input signal; a comparator for receiving the frequency band information $X$ from the memory under the first state of the input signal and applying an output to the read means when the frequency band information coincides with the output from the second counter, the comparator receiving the final value $Z$ of counts from the memory under the second state of the input signal and producing a phase output signal when the final value $Z$ of the counts coincides with the output of the second counter.

The above and other objects, features and advantages will be made apparent by the detailed description take in conjunction with the accompanying drawings, in which.

Figure 1:
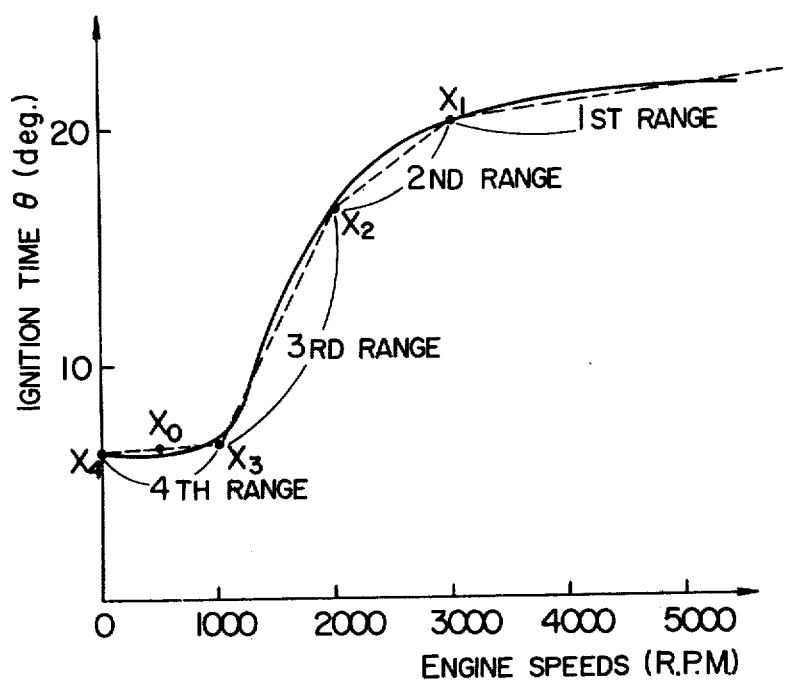
FIG. 1 is a diagram showing a method of determining a frequency band in the case where the present invention is applied to the ignition time control of the engine.

The relation between engine speeds and optimum ignition time (angle of lead) $\theta$ is shown in FIG. 1. An ignition time control apparatus will be described below in which frequencies are divided into four bands so that ignition time changes as shown in dotted lines in order to obtain characteristics as similar to the above-mentioned relation as possible. By the way, it will be naturally understood that the pattern of FIG. 1 should not be interpreted in a limiting sense as the number of frequency bands and changes in angle of less for each frequency band can be determined as desired.

Figure 2:
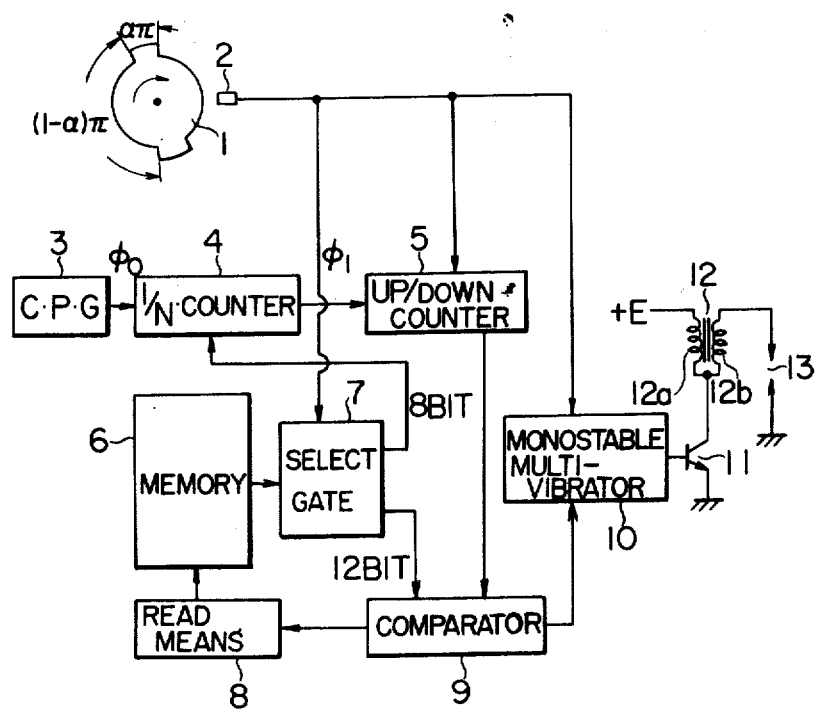
FIG. 2 shows a circuit configuration of the apparatus according to the present invention as it is applied to the engine ignition time control.

Referring to FIG. 2 showing a specific circuit configuration of the apparatus according to the present invention, reference numeral 1 shows a rotor directly coupled to the rotary shaft of a four-cylinder four-cycle engine provided with a notch for each 180° as one cycle. Numeral 2 shows a pick-up which may be a magnetic means magnetically detecting the notches of the rotor made of a magnetic material. Numeral 3 shows a clock pulse generator for producing clock pulses $\phi_0$ of repetition frequency $f_0$. Numeral 4 shows a 1/N counter for reducing the repetition frequency $f_0$ of the clock pulses $\phi_0$ to 1N, the value N being stored in the memory 6 and variable according to the output from the memory 6. The 1N counter may consist of a preset counter which produces an output each time a preset value coincides with the counts of the clock pulses $\phi_0$. The 1/N counter may alternatively be a combination of an up counter, a coincidence detector circuit and a set register. In such a case, the output from the memory 6 is input to the set register and the clock pulses $\phi_0$ are counted by the up counter, so that when they coincide with each other, an output is produced from the coincidence detector circuit thereby to clear the up counter. Numeral 5 shows a counter capable of up and down counting, which counts up (addition) output signal $\phi_1$ from the 1/N counter 4 at a high level in the range of $\alpha\pi$ of the output signal from the pick-up 2, while it makes down counts (subtraction) to the output signal of the 1/N counter 4 at a low level in the range of $(1 - \alpha)\pi$ of the output signal from the pick-up 2. Numeral 6 shows a memory for storing the frequency band information X, modulation coefficient information Y for each band and value of final counts Z. The frequency band information X is the values of counts made by up-down counter 5 corresponding to the frequencies 3000, 2000, 1000 and 0 at the lowest levels $X_1$, $X_2$, $X_3$ and $X_4$ in respective frequency bands. The modulation coefficient information Y is the value of N in 1/N by which the frequency $f_0$ of the output signal $\phi_0$ from the clock pulse generator is reduced in the counter 4, the value N varying with the frequency band. The relation between change in revolutions and hence ignition time for a particular band and the gradient of dotted lines in FIG. 1 depend on the value of N. Also, the value of Z, which is the final counts of the up-down counter 5 at the time point when a delay signal is produced during the down counting of the up-down counter 5, depends on the frequency band. It is thus necessary to store Y and Z in the number of bands.

Reference numeral 7 shows a select gate inserted between the output terminal of the memory 6 and the input terminals of the 1/N counter 4 and the comparator 9 and its electrical connection is turned on and off in response to the signal from the pick-up 2. When the signal from the pick-up 2 is at high level, the values corresponding to the minimum levels $X_1$, $X_2$, $X_3$ and $X_4$ of the frequency bands are applied to the comparator 9, while at the same time setting in the counter 4 the value YU on which the value N depends. When the output signal of the pick-up is at low level, on the other hand, the modulation coefficient Y determinative of the gradient of the frequency band determined as above and the final counts Z related thereto are applied respectively to the counter 4 and the comparator 9.

Reference numeral 8 shows a device for specifying a read address of the memory 6, whereby the read address is shifted by one in response to each pulse produced from the comparator 9. The device 8 may comprise an ordinary counter and a gate, or alternatively use a ring counter. In the latter case, the gate may be done without. The comparator 9 produces a pulse signal when the output of the up-down counter 5 coincides with that of the select gate 7. Numeral 10 shows a monostable multivibrator. When the pick-up signal is at low level, the output from the comparator 9 is applied to the monostable multivibrator 10, thus raising the output of the monostable multivibrator to a high level, followed by reduction to a low level after a predetermined period of time. Reference numeral 11 shows a transistor, which conducts at high level of the output of the monostable multivibrator and is cut off at low level thereof. Numeral 12 shows an ignition coil comprising a primary winding 12a and secondary winding 12b, the primary winding 12a being inserted between the power supply E and the collector of the transistor 11. In the energized state of the transistor 11, current flows in the primary winding 12a, so that electromagnetic energy stored during the cut-off state of the transistor 11 is released thereby to produce a high voltage in the secondary winding. Numeral 13 shows a discharge gap including an ignition plug in which a spark is started by discharge in response to a voltage generated in the secondary winding.

The above-mentioned operation will be described with reference to the graphs of FIG. 3.

Assume that the block pulses $\phi_0$ are shown by (a) and the clock pulses $\phi_1$ by (c). When the output (b) of the pick-up is at high level, the counts S of the counter 5 are made upward as shown by (d) in accordance with the clock pulses $\phi_1$, starting from zero to which the counter is reset prior to the counting operation even though it is not so shown in the drawing. Under this condition, the frequency of the pulses $\phi_1$ is $f_0/YU$ and remains unchanged since the value YU is constant during high level of the pick-up signal (b). Immediately after the counter 5 begins to count from zero, the high level of the ring counter 8 is set at a position for reading an address representing the highest band of the frequencies, that is, the first band in FIG. 1. As a result, the memory 6 produces an output including the information on that particular frequency band (the counts $X_1$ corresponding to the lowest frequency in that band), the modulation coefficient $Y_1$ and final counts $Z_1$, all which are eliminated by the select gate 7 at high level of the pick-up signal (b). The comparator 9, to which a digital value corresponding to the frequency band information $X_1$ is applied, compares it with the output from the counter 5. When the value of the counts S of the counter 5 coincides with the value of $X_1$, a pulse signal is produced from the comparator 9, so that a signal as shown in (e) is applied to the ring counter 8. The high level position shifts by one and the read address of the memory accordingly shifts, with the result that the memory output changes to $X_2$, $Y_2$ and $Z_2$, the value $X_2$ being compared with the counter output in the comparator 9. In this way, at high level of the pick-up signal, the frequency bands are shifted in accordance with the counts of the counter 5. When the pick-up signal is reduced to a low level, the memory 6 produces by way of the select gate 7 an output including $Y_4$ and $Z_4$, the value $Y_4$ being a modulation coefficient for the final band, that is, the fourth band in (d) at high level. In other words, of the output terminals for the memory outputs YU, $Y_4$, $X_4$ and $Z_4$, gates for those of YU and $X_4$ are closed while the gates for $Y_4$ and $Z_4$ are opened. The result is that the value N of the counter 4 shifts from YU to $Y_4$, and the value compared with the counter output in the comparator 9 changes from $X_4$ to $Z_4$. The counter 5 begins a subtraction as shown in (d) in response to the clock pulses with the frequency of $f_0Y_4$. When the counter output becomes equal to the value $Z_4$, a pulse signal as shown in (f) is applied to the monostable multivibrator 10 from the comparator 9. The output of the monostable multivibrator 10, as shown in (g) becomes a high level and the transistor 11 begins to conduct, thereby causing a current to flow in the primary winding 12a of the ignition coil 12, as shown in (h). After a predetermined period of time Te, the monostable multivibrator 10 becomes low in its output level and the current is cut off thereby to produce a spark output in the discharge gap.

Figure 3:
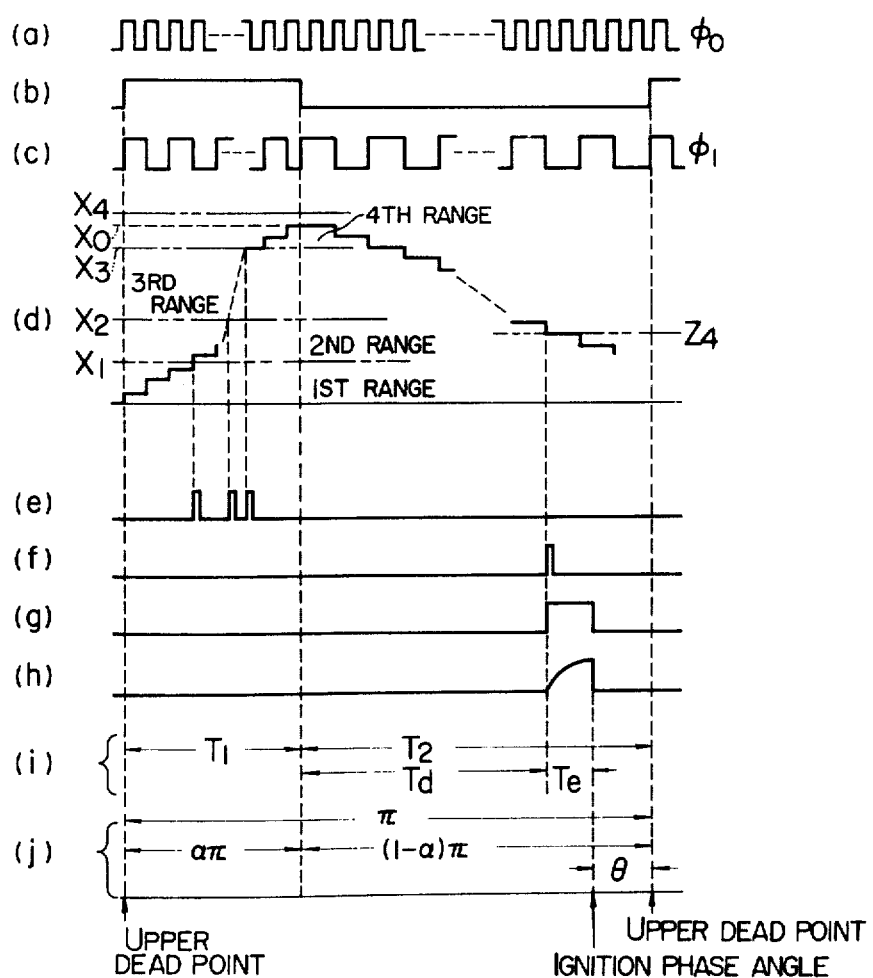
FIG. 3 is a time chart for explaining the operation of the circuit of FIG. 2.

Time scale and angular scale are determined as shown in (i) and (j) of FIG. 3. In other words, it is assumed that the time during which the pick-up output is at high level is determined as $T_1$, the time during which the pick-up output is at low level as $T_2$, the time period from the point of reduction of the pick-up output to the low level to the point at which the monostable multivibrator 10 is triggered as $Td$, and the time during which the monostable multivibrator 10 is at high level as $Te$. Also, it is assumed that $fu$ shows the frequency of the clock pulses $\phi_1$ at high level of the pick-up signal and $f_D$ its frequency at low level. The relation as shown below is obtained.

$$X_0 = fu \cdot T_1 \ldots \quad (1)$$

$$X_0 - Z_3 = f_D \cdot TD \ldots \quad (2)$$

Taking a four-cylinder four-cycle engine as an example, the rotational angle of one cycle of ignition is $\pi$ and when one piston locates at the upper dead point thereof as shown at right hand of the time scale of FIG. 3, a predetermined piston out of the remained three pistons is located at the upper dead point thereof as shown at left hand of the time scale, and therefore, if the time or angular ratio of the pick-up output at high level to that at low level is $\alpha/(1 - \alpha)$, the ignition phase angle $\theta$ against the upper dead point corresponding to the angle at which the pick-up transfers to the high level is expressed as shown in equation (3) below.

$$\theta = \frac{T_2 - (Td + Te)}{T_2} \cdot (1 - \alpha)\pi \quad (3)$$

Substituting the functions of equations (1) and (2) into equation (3), if the repetition frequency of ignition corresponding to engine revolutions is $1/(T_1 + T_2)$, the phase angle $\theta$ is expressed as follows:

$$\theta = \left( \left\{ 1 - (1 + \frac{fu}{f_D}) \cdot \alpha \right\} + (\frac{Z_3}{f_D} - Te) \cdot f \right) \pi$$

$$= (A + B \cdot f)\pi \quad (4)$$

where $A = 1 - (1 + \frac{fu}{f_D}) \cdot \alpha$ $B = \frac{Z_3}{f_D} - Te$

As will be apparent from equation (4), the phase angle $\theta$ increases in proportion to the frequencies, that is, revolutions when B is greater than zero. In like manner, when B is smaller than zero, the phase angle $\theta$ is inversely proportional to the engine revolutions, and the phase angle is constant irrespective of the frequencies when B is zero. By changing the constant term of A in equation (4), it is possible to shift the phase angle irrespective of frequencies.

As will be noted from the foregoing description, it is possible to determine a desired frequency-phase angle characteristic by appropriately selecting the constant term A and the proportional constant term B. The characteristics of the device can also be changed for respective frequency bands, which in turn can be determined by selection of values $X_1$ to $X_n$. Such a selection of values $X_1$ to $X_n$ will be described below.

The ratio $\alpha$ between the high level and low level of pick-up signal is constant without regard to the frequencies. $T_1$ is smaller as frequency becomes higher, while frequency $fu$ is constant. Therefore, counts inversely proportional to the frequencies of the pick-up signal are obtained by the up-down counter. The memory outputs are controlled to produce frequency bands $X_1, X_2, \ldots X_n$ in that order toward lower frequencies. In other words, a band of high frequency is arranged in the first read address. When the pick-up signal has been reduced to the low level, the counts $X_0$ of the up-down counter are $$X_0 = \frac{\alpha \cdot fu}{f} \quad (5)$$

thus satisfying the inequality $X_{n-1} < X_0 < X_n$. In this way, a band is selected at high level of the pick-up signal.

The frequency bands $X_1$ to $X_n$, $Y_1$ to $Y_n$ and $Z_1$ to $Z_n$ thus stored in the memory lead to the revolutions-ignition time characteristics as shown by dotted lines of FIG. 1.

The circuit according to the invention makes it possible to obtain the frequency-phase angle characteristics over a wide range of frequencies and can be effectively applied to the phase angle control from low speed to high speed of the rotary electric machines as well as to communication equipment which requires extensive phase angle control. Also, by adding to the embodiment a circuit for changing the value $\alpha$, the frequency-phase angle characteristics can be uniformly shifted. In the case of automobiles, for example, if the value $\alpha$ is determined as a function with the load as variable, it is possible to shift the revolutions-ignition time characteristics according to the load.

Figure 4:
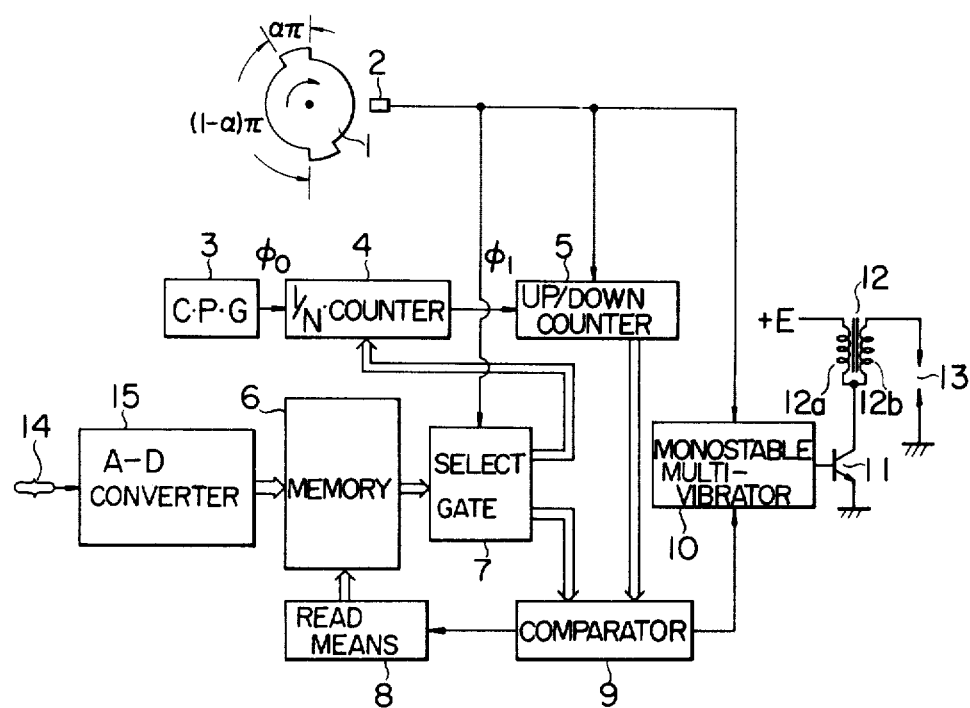
FIG. 4 is a diagram showing another embodiment of the invention as it is applied to ignition time control.

The embodiment of FIG. 2 shows an application of the invention to the phase control of the engine. In this case, the load condition is another important factor to be considered in view of purification of exhaust gas. Referring to FIG. 4 showing the embodiment under consideration, reference numeral 1 shows a rotor of magnetic material mounted on the shaft of an internal combustion engine which rotates with the internal combustion engine. The rotary rotation causes the pick-up 2 to perform a detecting operation, so that speed pulses as shown in (b) of FIG. 3 with frequencies varying with the rotational speed of the internal combustion engine are produced. The speed pulses are applied to the gate 7, monostable multivibrator 10 and up-down counter 5.

Information on load conditions detected by the negative pressure sensor 14 and converted into pulses by the A-D converter 15 and the modulation information on frequency bands of revolutions appropriately divided are stored in the memory 6. In response to the output of the memory 6, the frequency dividing ratio of the variable frequency dividing circuit 4 comprising a 1/N counter is changed and the output of the pulse generator as shown in (a) of FIG. 3 is applied to the up-down counter 5. The up-down counter 5 makes upward counts at high level of the output of the pick-up 2, that is, at high level of signal (b), and downward counts at low level thereof. The load condition information and the modulation information are used respectively for up and down counts.

The output of the up-down counter 5 is applied to the comparator 9 and compared with an output indicative of the low limit of the bands stored in the memory 6. The information on frequency bands of revolutions and the modulation information on the respective frequency bands which are stored in the memory 6 are produced therefrom during the up and down counting, respectively. When the output of the pick-up is at low level, the final counts are applied to the comparator 9, and the result of comparison is applied to the monostable multivibrator 10. As a result, the transistor 11 is turned on and off, current is made to flow in the ignition coil 12, and thus the ignition is started with the ignition plug 13.

It will be understood that the operation of the embodiment under consideration is almost the same as that of the circuit shown in FIG. 2. In the circuit of FIG. 2, the counter 4 is always set at a fixed value at high level of the output of the pick-up 2. In other words, the value N is fixed and therefore the frequency dividing ratio becomes constant, with the result that pulses of a fixed frequency ae applied to the up-down counter 5. In the circuit of FIG. 4, by contrast, the frequency dividing ratio of the counter 4 is variable even at high level of the output of the pick-up 2, and the variations in the frequency dividing ratio are further changed in response to the load condition information obtained from the A-D converter for improved accuracy of ignition time control.

When the output of the pick-up 2 is at high level, a fixed value stored in the memory 6 is not set in the counter 4, but a read address of the memory is determined in accordance with the output value of the A-D converter 15, which address is set in the counter 4 for improved accuracy of ignition timing.

The embodiments of FIG. 2 and FIG. 4 show cases applied to the transistor ignition system, in which a spark is generated at the ignition plug 13 by means of energy stored in advance in the primary winding 12a of the ignition coil 12. In spite of this, there is a different type of ignition device in which electric energy stored in advance in the capacitor is discharged through the primary winding 12a to produce an ignition spark. In the latter case, the ignition device may be triggered by the output of the monostable multivibrator 10 or alternatively the pulses f of FIG. 3 may be used for ignition with the value Te in equation (4) maintained at zero. As a result, the value of B is always positive, thereby limiting the characteristics in such a manner that the phase only increase in accordance with revolutions. If positive, negative and zero values of B are to be selected as desired, a monostable multivibrator is preferably provided to trigger the ignition device by a signal delayed by the monostable multivibrator. In such a case, the triggering may be effected at a fall point in (g) of FIG. 3.

It will be thus noted that the present invention has the advantages:

1. that complicated frequencies (revolutions)-phase angle characteristics are obtained, thus providing a very convenient electronic circuit means for controlling the revolutions-ignition time characteristics for automobiles;

2. that since the frequency-phase angle characteristics are calculated by digital techniques, a highly accurate control characteristic can be easily achieved by increasing the clock frequencies of the oscillator circuit; and 3. that the digital circuit can be formed by integrated circuitry because of its low power consumption, resulting in high reliability and high productivity.

What is claimed is:

1. A phase control apparatus for an ignition timing control system of an internal combustion engine comprising:
    a clock pulse generator for producing pulses having a predetermined frequency;
    a first controllable counter, having a control input, for counting pulses produced by said clock pulse generator and producing an output for each selectable number of pulses counted;
    memory means for storing
        first information X representative of the speed of said engine within a respectively defined engine speed band,
        second information YU represevative of a first modulation coefficient which corresponds to a first number of pulses to be counted by said counter,
        third information Yn representative of a second modulation coefficient which corresponds to a second number of pulses to be counted by said counter, and
        a value Z corresponding to a final count;
    input means for producing a first state signal $\alpha\pi$ and a second state signal $(1-\alpha)\pi$ in accordance with the rotation of said engine;
    a second controllable counter for receiving the output pulses produced by said first controllable counter and the first and second state signals produced by said input means, and for counting up the output pulses from said first controllable counter during receipt of said first state signal $\alpha\pi$, and for counting down the ouput pulses from said first controllable counter during receipt of said second state signal $(1-\alpha)\pi$;
    a controllable comparator for comparing the value X stored in said memory means with the count content of said second controllable counter and for generating an output signal when the count content of said second controllable counter becomes equal to said value X;
    read means, coupled between said comparator and said memory, for shifting the readout address of said memory in accordance with the output signal from said comparator;
    gate means, coupled between the output of said memory, the control input of said first controllable counter, and an input of said comparator, for applying said first information X from said memory means to said comparator in accordance with said first state signal $\alpha\pi$ from said input means, and for applying said second information Yn and said value Z from said memory means to said first controllable counter and to said comparator, respectively, in accordance with said second state signal $(1-\alpha)\pi$ from said input means; and
    output means, coupled to said input means and said comparator, for generating an output control signal in accordance with the outputs of said comparator and said input means.

2. A phase control apparatus according to claim 1, further comprising means for detecting the load conditions of said engine and means for converting the output of said load condition detecting means into a digital signal and for applying a second read address signal to said memory means.

3. A phase control apparatus according to claim 1, wherein the output control signal from said output means controls the primary current of an ignition coil for producing a spark voltage in a secondary winding of said ignition coil.

4. A phase control apparatus according to claim 1, wherein said output control means has a predetermined time delay for delaying said output signal in response to the output from said comparator.

5. A phase control apparatus according to claim 4, wherein said output means comprises a multivibrator.

6. A phase control apparatus according to claim 4, further comprising means for detecting the load conditions of said engine and means for converting the output of said load condition detecting meas into a digital signal and for applying a second read address signal to said memory means.

7. A phase control apparatus according to claim 6, wherein the output control signal from said output means controls the primary current of an ignition coil for producing a spark voltage in a secondary winding of said ignition coil.

8. A phase control apparatus according to claim 7, wherein said output means comprises a multivibrator.

* * * * *